(No Model.)
C. F. BUCKLEY.
AIR AND WATER PURIFIER.
No. 511,995. Patented Jan. 2, 1894.
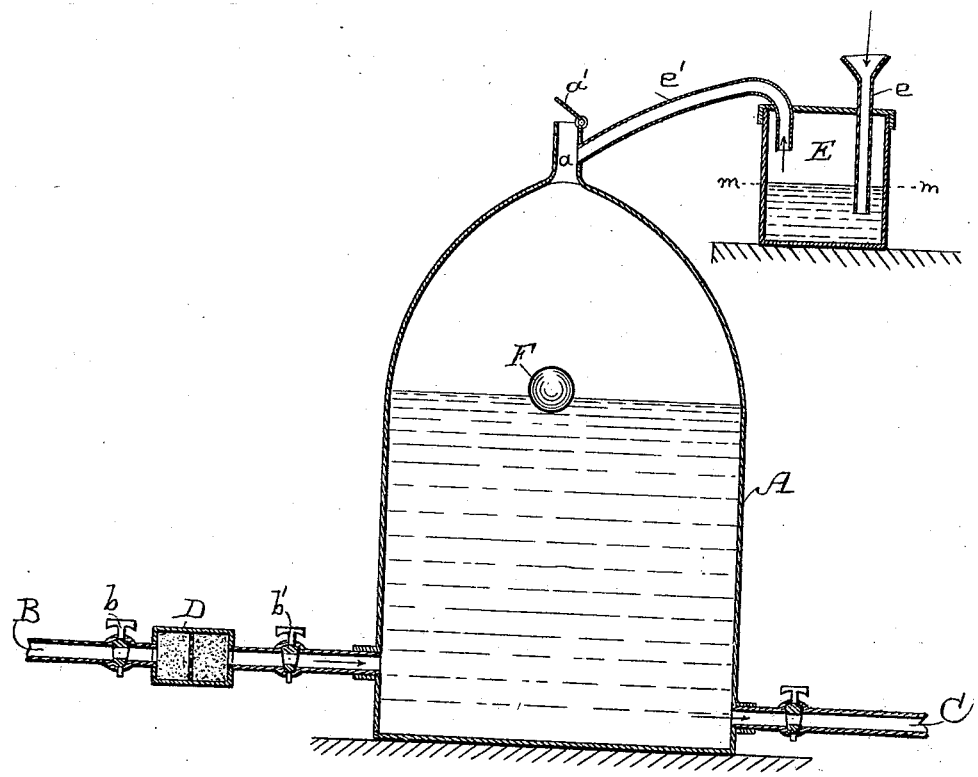
Witnesses,
J. H. Bayless
Inventor,
Cornelius F. Buckley.
By Dewey & Co.
attys

UNITED STATES PATENT OFFICE.

CORNELIUS F. BUCKLEY, OF SAN FRANCISCO, CALIFORNIA.

AIR AND WATER PURIFIER.

SPECIFICATION forming part of Letters Patent No. 511,995, dated January 2, 1894.

Application filed March 6, 1893. Serial No. 464,878. (No model.)

*To all whom it may concern:*

Be it known that I, CORNELIUS F. BUCKLEY, a subject of the Queen of Great Britain, residing in the city and county of San Francisco, State of California, have invented an Improvement in Air and Water Purifiers; and I hereby declare the following to be a full, clear, and exact description of the same.

My invention relates to the general class of purifiers for water and other liquids and substances.

It consists in a novel apparatus comprising a reservoir or tank for the water or other material having an inlet and an outlet, an air disinfector, and an automatically operating connection between said air disinfector and the reservoir or tank, whereby the water or other material in the reservoir is subjected to contact with disinfected air only.

The object of my invention is to effectually avoid the contamination of water and other substances by non-disinfected air. In the practical employment of a sufficient storage for water, such as in a tank or reservoir involving the free inflow and outflow of the water, it is a difficult matter to avoid contact with the ordinary air, and the most obvious method, namely, that of using an air-tight receptacle, is open to many disadvantages in its ordinary use, the principal one of which is the necessity of keeping it always full of water, requiring a constant pressure from the main or inlet. Another disadvantage is the exclusion of all air. But with my apparatus the reservoir or tank for the water or other substance, may be drawn on at all times, irrespective of the amount within it, the necessary atmospheric pressure for its free flow being supplied, but only with disinfected air, which also serves to properly aerate it without contamination.

Referring to the accompanying drawing for a more complete explanation of my invention,—the figure is a vertical section of my apparatus.

A is a closed tank or reservoir of suitable construction and capacity. It is provided with the inlet pipe B, from the water main, and with the cock controlled outlet pipe C, for service. Its top is provided with the air exhaust passage $a$ having at its outer end a check valve $a'$. If filtered water is to be used, there is fitted in inlet pipe B a filter D of any suitable construction and containing any desired filtering media. I have here represented it as consisting of two boxes which I propose to fill, the one with charcoal and the other with iron filings. A cock $b$ may be placed in pipe B, in advance of the filter, and another $b'$ behind it, whereby the passage of water may be controlled, and the contents of the reservoir confined, when for any purpose, as for cleansing, the filter may have to be temporarily removed.

E is a closed air-disinfecting case or bottle. It has an air inlet pipe or funnel $e$, and an air outlet pipe $e'$, the latter communicating with the top of the reservoir A, or as here shown with the air exhaust passage $a$. This air disinfector may be of any suitable construction or arrangement, and its contents may be of any proper character. I propose to use in it a solution of chloride of iron, the level of which will be maintained, as shown by the line $m$—$m$, above the lower end of inlet funnel $e$ and below the lower end of outlet pipe $e'$.

Within reservoir A is a valve for automatically closing the top of the reservoir to prevent the overflow of water therefrom. In the present case I have shown this valve as a float ball F, which will rise with the water and will seat itself in the inner end of exhaust passage $a$, thereby preventing the outflow of water through said passage, and also preventing it from overflowing through pipe $e'$ into the air disinfector case or bottle E.

The operation of the apparatus is as follows: Water, from the main, passing through pipe B, enters the reservoir A. When the filter D is used, it enters as filtered water. As it fills said reservoir, the air is expelled through the passage $a$ and check valve $a'$, and when the reservoir is full the float valve F confines the water. Now, when the water is drawn upon by the opening of service pipe C, the check valve $a'$ will close and cut off all direct communication with the outer air, but air will pass down funnel $e$, through the disinfecting medium in bottle or case E, and thence as disinfected air will pass through pipe $e'$, into the reservoir A, to occupy the space left vacant by the lowering water therein. Thus, only disinfected air will be admitted and come in contact with the contents of the reservoir which will serve not only to avoid contamination but also to aerate the water and to permit its ready outflow for use.

The filling of the reservoir may take place at such stated periods as may be desired, and when fresh water is admitted, the air previously in the reservoir, will be driven out as before explained, and disinfected air again admitted as the water is drawn off for use.

It will be noticed that my tank may be placed in any room without the slightest danger of overflow since the ball valve will simultaneously close both the air inlet and the air outlet. Not only so but there is no danger of the outgoing air entering the disinfecting tank since it has any easier passageway past the valve in the air outlet and this is very important for under main pressure the tank or reservoir rapidly fills which might force out the air under sufficient pressure to cause the liquid disinfectant to be blown out through the filling tube, if the outgoing air could enter therein. I am also enabled by my construction to use a smaller tank than otherwise by having the air outlet and its valve operate in the top of the tank. The float valve simultaneously closes both the air outlet and air inlet when the tank is full and when the level of the water falls the float ball falls with it which closes the air outlet valve and permits the entrance of disinfected air to prevent a vacuum and the ball valve will not close or diminish the air outlet passage until the tank or reservoir is completely filled, and then it also closes the air inlet.

Having thus described my invention, what I claim as new, and desire to secure by Letters Patent, is—

1. An apparatus of the character described comprising a reservoir having inlet and outlet pipes, an air outlet in the top of the reservoir provided with a downward closing valve, a closed tank for containing solid or liquid disinfecting or purifying material, an air supply tube leading from the top of the said tank to the top of the said reservoir, an air inlet pipe extending downwardly into the said tank below the level reached by the material therein, and means in the reservoir for simultaneously and automatically closing the air outlet and air inlet thereof when the entering liquid fills the said reservoir, substantially as herein described.

2. An apparatus of the character described consisting in the reservoir provided with a water inlet and outlet and also having an air outlet tube in its top, a downwardly closing valve for said tube a closed tank for containing liquid or other disinfecting or purifying material, a pipe leading from the top of said tank to the said tube below its valve, an air inlet pipe extending down into the said tank below the level of the material contained therein, and a float ball within the reservoir to register with the lower end of the said tube when the reservoir is full and thus close the air inlet and outlet against the entrance of water thereto, substantially as herein described.

In witness whereof I have hereunto set my hand.

CORNELIUS F. BUCKLEY.

Witnesses:
S. H. NOURSE,
GEO. H. STRONG.